UNITED STATES PATENT OFFICE.

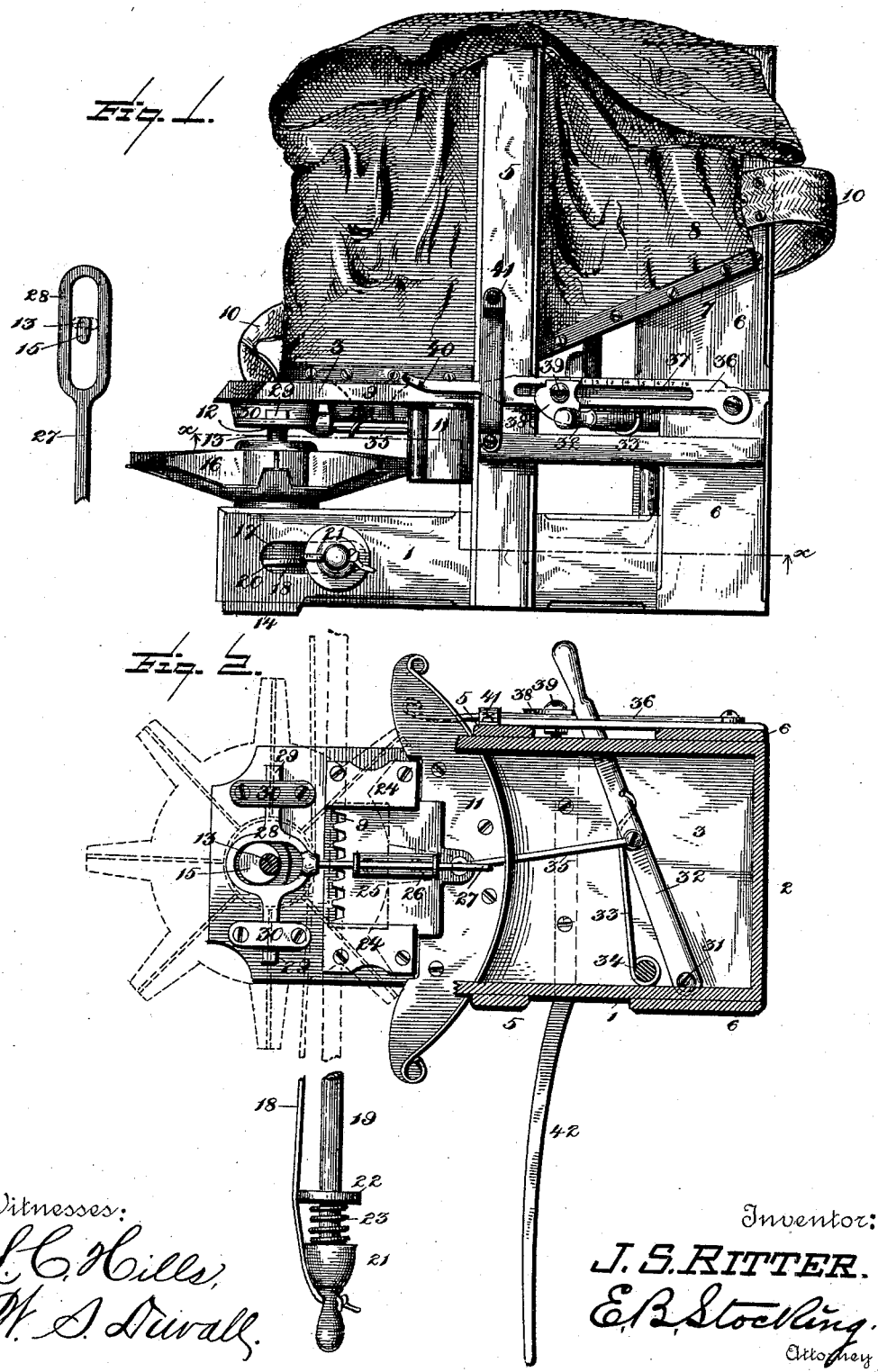

JACOB S. RITTER, OF MEDINA, OHIO, ASSIGNOR OF ONE-HALF TO ADAM BISHOP, OF SAME PLACE.

BROADCAST SEED-SOWER.

SPECIFICATION forming part of Letters Patent No. 391,861, dated October 30, 1888.

Application filed June 19, 1888. Serial No. 277,538. (No model.)

*To all whom it may concern:*

Be it known that I, JACOB S. RITTER, a citizen of the United States, residing at Medina, in the county of Medina, State of Ohio, have invented certain new and useful Improvements in Broadcast-Seeders, of which the following is a specification, reference being had therein to the accompanying drawings.

This invention has relation to an improvement in broadcast hand seed-planters, and the objects and advantages thereof will hereinafter appear, and the novel features will be particularly pointed out in the claims.

Referring to the drawings, Figure 1 is a side elevation of a planter constructed in accordance with my invention; and Fig. 2 is a transverse section on lines x x of Fig. 1, looking in the direction indicated by the arrows.

Like numerals of reference indicate like parts in both figures of the drawings.

The box or frame of the planter consists of the usual side and end walls, 1 and 2, upon which is mounted the base 3 of the machine. At each side of the frame, and forming a part thereof, are vertical posts 5 and 6, the same being extended beyond the base 3. Between the posts thus extended is mounted the inclined hopper-bottom 7, the hopper-walls being formed by means of a flexible sack or bag, 8, secured to the bottom and near the front edge of the base 3, near which point in the base and at or about the termination of the inclined bottom 7 there is formed an opening, 9. (See Fig. 2.) A suitable shoulder-strap, 10, is provided, one end being made fast to the post 6 and the other detachably connected to the front of the base 3 or other suitable point of the frame, whereby the carrying of the machine is facilitated. A flanged guard, 11, is secured to the under surface of the base 3 in front of the posts 5, and prevents the scattering of the seed upon the clothes of the operator.

Journaled in suitable bearings, 12, provided upon the under surface of the base 3, near the front end thereof, is a vertical shaft, 13, the lower end of which is journaled in a bearing (not shown) formed in a cross-piece, 14, which connects the side pieces, 1, at their front ends. Upon this shaft is formed an eccentric, 15, for transmitting motion therefrom, and below the same is mounted a seed-casting star-shaped wheel, 16, which rotates under the seed-opening 9, formed in the base 3. Below the wheel 16 there is mounted upon the shaft a drum, 17, which receives oscillatory movement from a thong, 18, passed therethrough and having its ends adjustably connected to the opposite ends of a reciprocating hand shaft or rod, 19, which is passed through openings 20, formed in the side piece, 1. At each end of the rod, in front of its handles 21, there are mounted disks 22, of leather or other suitable buffing material, and interposed between the same and the handles are coiled springs 23, so that all concussion occurring between the handles 21 and the side pieces, 1, is avoided.

At each side of the seed-opening 9 and secured to the under surface of the base 3 is a way, 24, in which is mounted for reciprocation a feed-plate, 25, provided with the usual seed-passages at its front edge. Secured to this plate from front to rear thereof is a bracket, 26, and rigidly yet removably connected thereto is an arm, 27, the forward end of which is connected with an elongated cam-ring, 28, which receives the eccentric 15. Arms 29 project from opposite sides of the ring and under retaining-straps 30, secured to the under surface of the base 3, so that rotary motion given the shaft will, through the eccentric and ring, impart an oscillatory motion to the seed-plate, thus agitating the contents of the hopper and causing the seed to pass through the plate to the wheel, and this, being in motion, scatters the seed broadcast.

It now remains to provide a means for wholly or partially cutting off the supply of seed and adjusting the plate for the emission of seed of different sizes and quantities.

Pivoted to the under surface of the bottom 3, as at 31, is a lever, 32, the free or swinging end of which projects through the opposite side of the frame, a spring, 33, one end of which is coiled around a post, 34, and the opposite end of which is connected to the lever, serves to draw the latter toward the front of the machine. A rod, 35, has one of its ends pivoted to the end of the seed-plate 25 and its opposite end likewise connected to the lever 32.

At that side of the frame through which the lever 32 projects there is pivoted a latch or arm, 36, the same being longitudinally slotted, as at 37, in which is mounted for movement an adjustable movable stop, 38, provided with an adjusting-screw, 39, said stop being projected with a front curved or beveled face and a rear plain face, the lower end of the stop projecting into the path of the free end of the lever. The lever 36 is provided with a handle, 40, at its free end, and a bail or strap, 41, secured to the post 5, serves to maintain the said lever in working position. By this construction it is apparent that the stop 38 may be adjusted in accordance with a scale formed on the lever 36, which will set the lever 32 at that point. Should it be desirable to entirely cut off the supply of seed, the handle 40 of the lever 36 is raised, withdraws the stop from in front of the lever 32, and liberates the same, and the spring 33 draws the lever 32 to the front and closes the seed-plate over the seed opening. To resume operation, simply draw the lever 32 to the rear until it passes the stop 38, when the latter and its arm 36 will drop in place.

A rigid arm, 42, projects from the frame and serves to further support and steady the machine during its operation by passing in front of and resting against the body of the operator.

At the left of Fig. 1 I have shown a slightly-modified form for transmitting oscillatory motion from the shaft 13 to the seed-slide, and it consists in forming a blade upon the shaft, which rotates in a slot formed in the rod 25.

Having described my invention, what I claim is—

1. The combination, with the frame-work, of the shaft 13, having the eccentric 15, and of the seed-plate 25, mounted in ways 24, the rod 27, the ring 28, and plates 30, substantially as specified.

2. The combination, with the plate 25, mounted in ways 24, of the lever 32, connected thereto by the rod 35 and having the spring 33, and of the pivoted gravity-lever 36, slotted, as at 37, and carrying the adjustable stop 38, substantially as specified.

3. The combination, with the frame-work, of the laterally-projecting curved steadying-arm 42, substantially as specified.

4. The combination, with the shaft 13, having the eccentric 15, the cam-ring 28, having the rod 27 mounted thereon, the seed-plate 25, having its bracket 26, and connected to the plate by the rod 27, substantially as specified.

5. The combination, with the shaft 13, having the eccentric 15, of the ring 28, mounted thereon and provided with the lateral projections 29, the plates 30 for receiving the same, the plate 25, connected with the ring by means of the arm 26, and of the spring-actuated lever 32, pivoted, as at 31, the pivoted lever 36, slotted, as at 37, and having a scale, and an adjustable stop, 38, for throwing into and out of the path of the lever 32, substantially as specified.

In testimony whereof I affix my signature in presence of two witnesses.

JACOB S. RITTER.

Witnesses:
F. O. PHILLIPS,
C. D. FREEMAN.